United States Patent
Huang et al.

(10) Patent No.: US 11,761,565 B2
(45) Date of Patent: Sep. 19, 2023

(54) CLAMP RING TYPE METAL SEALGAS PIPE JOINT

(71) Applicant: NINGBO HONGWU PIPE INDUSTRY CO., LTD, Ningbo (CN)

(72) Inventors: Shuangwu Huang, Ningbo (CN); Jiaqi Sun, Ningbo (CN); Yifeng Jiang, Ningbo (CN)

(73) Assignee: NINGBO HONGWU PIPE INDUSTRY CO., LTD, Ningbo (CN)

( * ) Notice: Subject to any disclaimer, the term of this patent is extended or adjusted under 35 U.S.C. 154(b) by 0 days.

(21) Appl. No.: 17/456,593

(22) Filed: Nov. 26, 2021

(65) Prior Publication Data
US 2023/0167926 A1 Jun. 1, 2023

(51) Int. Cl.
*F16L 13/16* (2006.01)
*F16L 19/028* (2006.01)

(52) U.S. Cl.
CPC ......... *F16L 13/161* (2013.01); *F16L 19/028* (2013.01)

(58) Field of Classification Search
CPC ..... F16L 13/14; F16L 19/028; F16L 19/0283; F16L 19/0286; F16L 19/0206; F16L 19/05; F16L 13/161
USPC .................................................. 285/903
See application file for complete search history.

(56) References Cited

U.S. PATENT DOCUMENTS

| | | | | |
|---|---|---|---|---|
| 2,748,463 A * | 6/1956 | Mueller | ........ | F16L 19/028 29/523 |
| 6,173,995 B1 * | 1/2001 | Mau | ........ | F16L 25/0036 285/903 |
| 7,607,700 B2 * | 10/2009 | Duquette | ........ | F16L 19/041 285/903 |
| 7,690,693 B2 * | 4/2010 | Moner | ........ | F16L 25/0036 285/903 |
| 7,690,695 B2 * | 4/2010 | Duquette | ........ | F16L 25/0036 285/903 |
| 8,766,110 B2 * | 7/2014 | Daughtry | ........ | F16L 19/025 285/334.5 |
| 9,541,225 B2 * | 1/2017 | Strunk | ........ | F16L 19/00 |
| 10,024,469 B2 * | 7/2018 | Strunk | ........ | F16L 25/01 |
| 10,281,071 B2 * | 5/2019 | Strunk | ........ | F16L 19/041 |
| 11,359,754 B2 * | 6/2022 | Farr | ........ | F01N 13/00 |

* cited by examiner

*Primary Examiner* — David Bochna
(74) *Attorney, Agent, or Firm* — Bayramoglu Law Offices LLC

(57) ABSTRACT

A clamp ring type metal seal gas pipe joint is connected to one end of a gas pipe, and includes a fitting joint, a nut, and a clamp ring. Axial contact surfaces of the clamp ring and the fitting joint are respectively provided with a convex portion configured in a convex V shape and a concave portion configured in a concave V shape matched with each other, so that an end part of the gas pipe is compressed and self-flared to form a sealing part when the fitting joint is tightened. In the process of tightening the nut and the fitting joint, the end part of the metal bellow is compressed and self-flared by the convex portion of the clamp ring and the concave portion of the fitting joint to form a cone surface to realize limit fixation and form a double sealing.

8 Claims, 4 Drawing Sheets

CLAMP RING TYPE METAL SEALGAS PIPE JOINT

TECHNICAL FIELD

The present invention relates to the technical field of gas pipes, particularly to a clamp ring type metal seal gas pipe joint.

BACKGROUND

A gas pipe joint is used to connect a gas pipe to achieve gas transport.

Presently, the gas pipe joints on the market are generally composed of nuts, fitting joints, half-and-half type clamp rings, and copper gaskets. During installation, it is necessary to unscrew fitting joints first, then install parts on one end of a metal bellow in sequence, and finally tighten them. However, a local fitting surface is dislocated after being tightened due to the lack of a limit when an end surface of the metal bellow is compressed and deformed freely in the process of tightening, resulting in a possibility of leakage.

SUMMARY

The present invention designs a clamp ring type metal seal gas pipe joint, which solves the technical problem that for the gas pipe joint on the current market, local fitting surface is dislocated after being tightened due to the lack of a limit when an end surface of a metal bellow is compressed and deformed freely in the process of tightening, resulting in a possibility of leakage.

In order to solve the above technical problem, the present invention adopts the following solutions.

A clamp ring type metal seal gas pipe joint, connected to one end of a gas pipe, includes a fitting joint, a nut, and a clamp ring. Axial contact surfaces of the clamp ring and the fitting joint are respectively provided with a convex portion and a concave portion matched with each other, so that an end part of the gas pipe is compressed and self-flared to form a sealing part when the fitting joint is tightened.

Further, the concave portion is configured in a concave V shape, and the convex portion is configured into a convex V shape.

Further, the concave portion is formed on the fitting joint, and the convex portion is formed on the clamp ring.

Further, the gas pipe includes a bellow and a cover layer, the cover layer is wrapped outside an outer surface of the bellow, and an end part of the bellow exceeds an end part of the cover layer to form an exposed end.

Further, the clamp ring is sleeved on an outside of the exposed end of the bellow, and an inner surface of the clamp ring is provided with a peak and a valley matched with a ripple on the outer surface of the bellow.

Further, the convex portion is arranged on the peak of the clamp ring.

Further, the convex portion and the concave portion compress the bellow to form a first sealing surface and a second sealing surface.

Further, the clamp ring is a half-and-half type clamp ring.

Further, materials of the fitting joint, the nut, and the clamp ring are all copper.

Further, a material of the bellow is stainless steel, and a material of the cover layer is plastic.

The clamp ring type metal seal gas pipe joint has the following advantages:

In the hard clamp ring sealing gas pipe joint of the present invention, axial contact surfaces of the clamp ring and the fitting joint are respectively provided with the convex portion configured in a convex V shape and the concave portion configured in a concave V shape matched with each other. In the process of tightening the nut and the fitting joint, the end part of the metal bellow is compressed and self-flared by the convex portion of the clamp ring and the concave portion of the fitting joint to form a cone surface to realize limit fixation and form a double sealing, which effectively prevents the leakage caused by dislocation of the joint after being tightened, and avoids the use of copper gasket. Therefore, compared with the existing gas joints, the gas pipe joint of the present invention is safer and has a better sealing effect. Moreover, the gas pipe joint of the present invention has the properties of high-temperature resistance and corrosion resistance due to the utilization of metal seal technology.

REFERENCE NUMBERS 1-fitting joint; 2-clamp ring; 3-nut; 4-bellow; 5-cover layer; 6-concave portion; 7-convex portion; 8-first sealing surface; 9-second sealing surface.

DETAILED DESCRIPTION OF THE EMBODIMENTS

The present invention is further illustrated below in combination with FIGS. 1 to 7.

Figure 1:
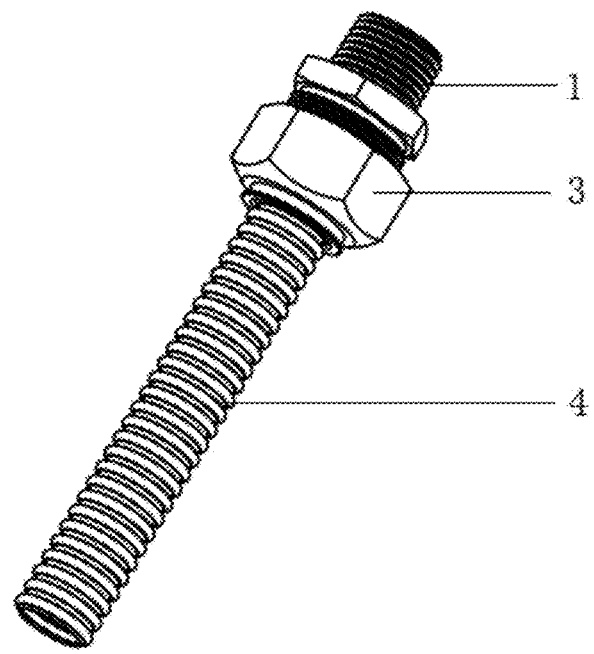
FIG. 1 is an overall schematic view of the present invention.
Figure 2:
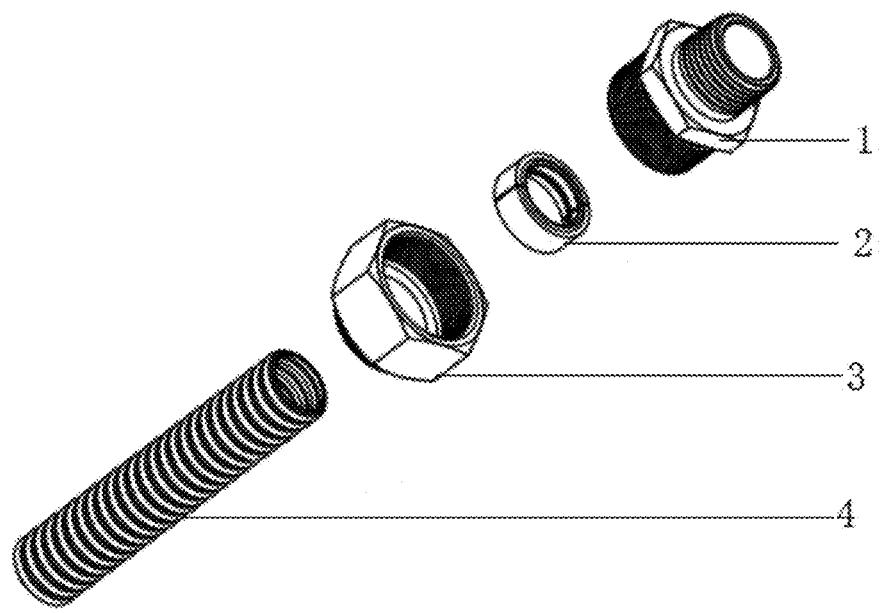
FIG. 2 is a first exploded view of the present invention.
Figure 3:
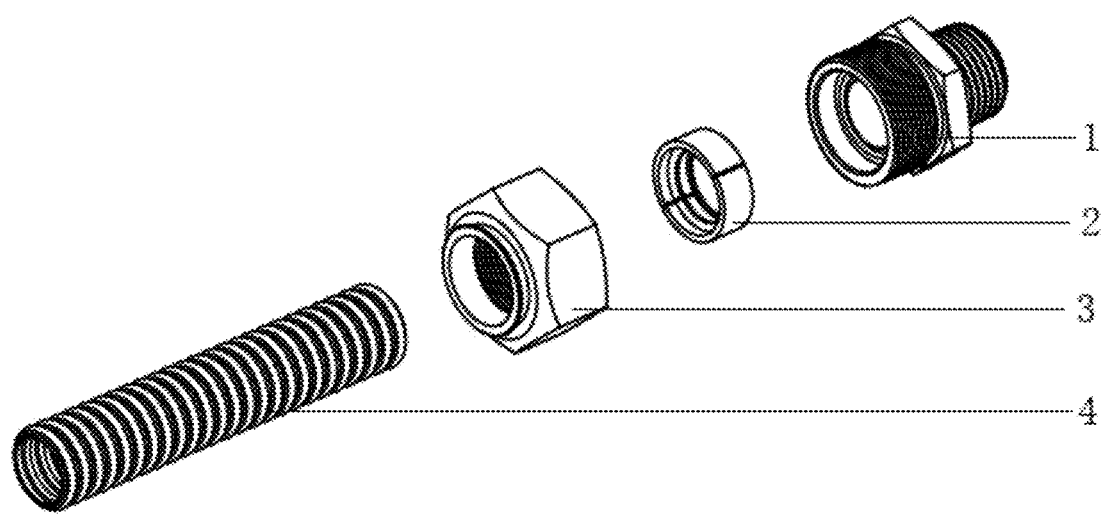
FIG. 3 is a second exploded view of the present invention.

As shown in FIGS. 1 to 3, a clamp ring type metal seal gas pipe joint has one end connected to the end part of a gas pipe and the other end for connecting other devices, which includes the fitting joint 1, the nut 3, and the clamp ring 2.

The back end of the fitting joint 1 is provided with an external thread, the nut 3 is provided with an internal thread matched with the external thread, and the clamp ring 2 is a half-and-half type clamp ring. The materials of the fitting joint 1, the nut 3 and the clamp ring 2 are all copper. The gas pipe includes the bellow 4 and the cover layer 5. The material of the bellow 4 is stainless steel and the material of the cover layer 5 is plastic. The cover layer 5 is wrapped outside the outer surface of the bellow 4, and the end part of the bellow 4 exceeds the end part of the cover layer to form an exposed end. The clamp ring 2 is sleeved on the outside of the exposed end of the bellow 4, and the inner surface of the clamp ring 2 is provided with a peak and a valley matched with a ripple on the outer surface of the bellow 4.

Figure 4:
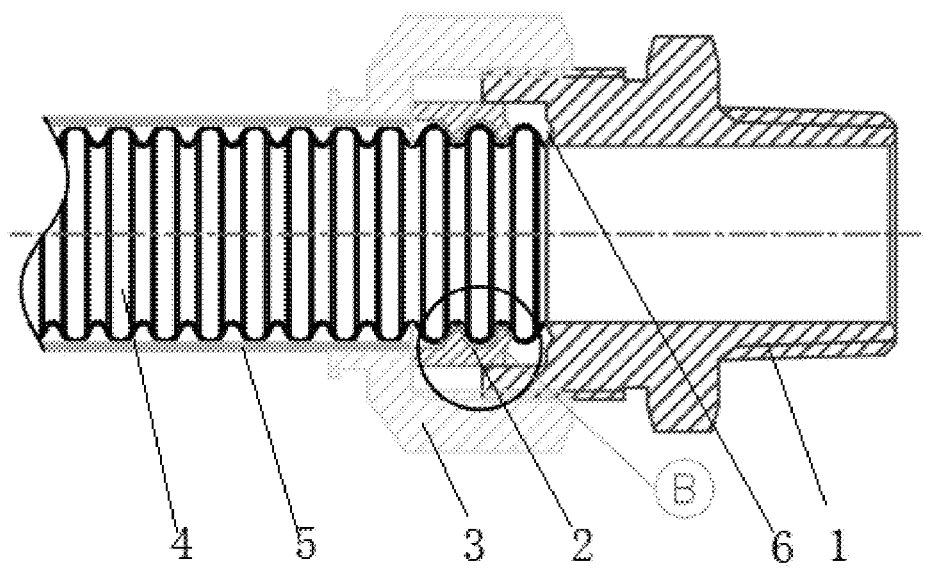
FIG. 4 is a cross-sectional view of the present invention before installation.
Figure 5:
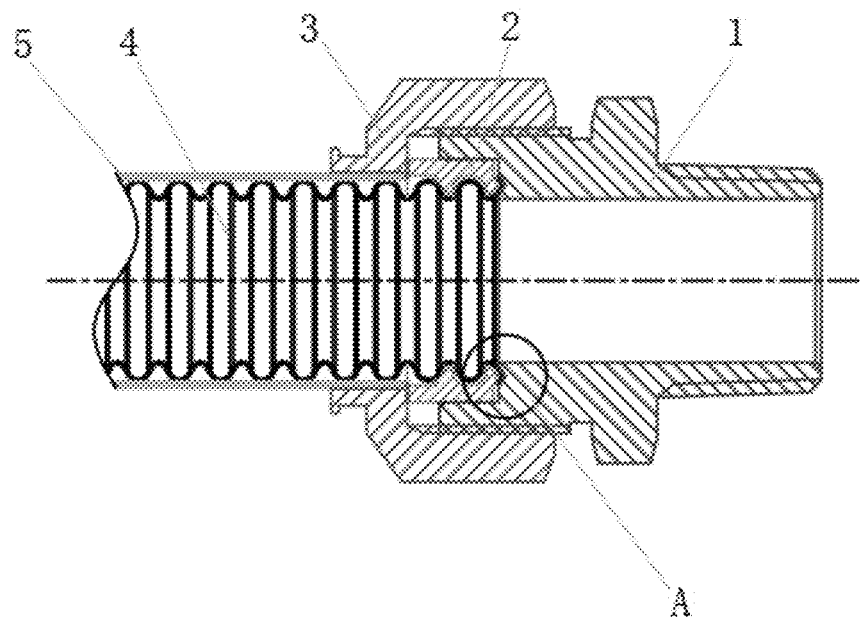
FIG. 5 is a cross-sectional view of the present invention after installation.
Figure 6:
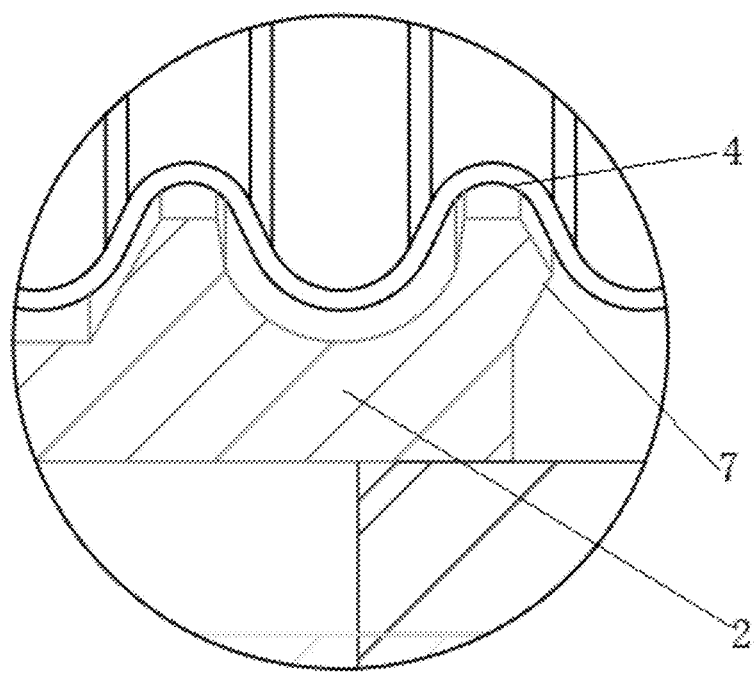
FIG. 6 is an enlarged view of portion B in FIG. 4.
Figure 7:
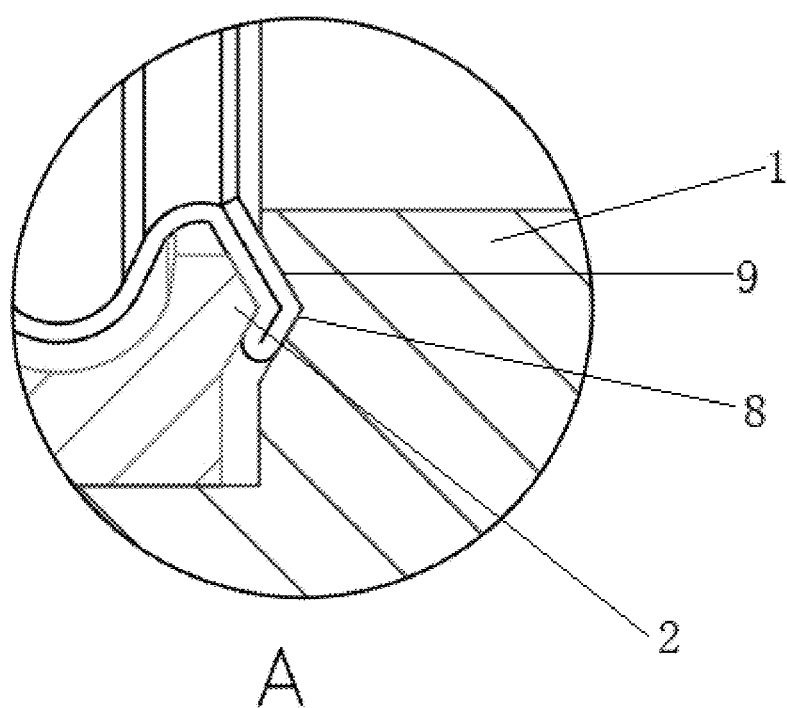
FIG. 7 is an enlarged view of portion A in FIG. 5.

As shown in FIGS. 4 and 5, axial contact surfaces of the clamp ring 2 and the fitting joint 1 are respectively provided with the convex portion 7 and the concave portion 6 matched with each other, so that the end part of the gas pipe is compressed and self-flared to form a sealing part when the fitting joint 1 is tightened. The concave portion 6 is formed on the fitting surface of the fitting joint 1, and the convex portion 7 is formed on the fitting surface of the clamp ring 2. The concave portion 6 is configured into a concave V shape, and the convex portion is configured into a convex V shape. The convex portion 7 is arranged on the peak of the outermost side of the front end of the clamp ring 2, and the front end of the clamp ring 2 is engaged into a concave ripple of the bellow 4.

The fitting surface of the fitting joint 1 and the fitting surface of the clamp ring 2 flatten a ripple of the bellow 4 to form a cone surface to achieve a sealing when the fitting joint 1 and the nut 3 are tightened axially via threads. The convex portion 7 and the concave portion 6 compress the bellow 4 to make a ripple of the bellow 4 to become V-shaped. At the same time, the sealing cone surface is reversely self-flared to form a double-layer V-shaped structure, thus forming the first sealing surface 8 and the second sealing surface 9, further enhancing the sealing effect.

The working principle of the present invention is as follows:

A convex ripple at the frontmost end of the bellow 4 is deformed under the compressing action between the convex portion 7 configured in the convex V shape of the clamp ring 2 and the concave portion 6 configured in the concave V shape of the fitting joint 1 after tightening the nut 3 and the fitting joint 1, so that the end part of the front end of the bellow 4 forms a double-layer V-shaped structure and fits with the concave portion 6 to form two sealing surfaces, namely the first sealing surface 8 and the second sealing surface 9, which concurrently realizes limit fixation and achieves the effect of double sealing.

The above exemplary description of the present invention is given in conjunction with the drawings, and it is obvious that the implementation of the present invention is not limited by the above manner. Various improvements based on the inventive concept and the technical solutions of the present invention or the direct use of the concept and the technical solutions of the present invention to other occasions without modifications are all within the protection scope of the present invention.

The invention claimed is:

1. A clamp ring type metal seal gas pipe joint, wherein the clamp ring type metal seal gas pipe joint is connected to one end of a gas pipe, and the clamp ring type metal seal gas pipe joint comprises a fitting joint, a nut, and a clamp ring, wherein axial contact surfaces of the clamp ring and axial contact surfaces of the fitting joint are formed along vertical, flat end wall portions and are respectively provided with a convex portion including a pair of first angled surfaces configured into a convex V shape and having a first apex that joins said first angled surfaces and a concave portion including a pair of second angled surfaces configured into a concave V shape and having a second apex that joins said second angled surfaces, wherein the convex V shape having said first apex joining said first angled surfaces is matched and complementary to the concave V shape having said second apex joining said second angled surfaces, wherein the fitting joint and the clamp ring are configured so that an end part of the gas pipe is compressed between the convex portion and the concave portion and is in contact with said first apex joining said first angled surfaces and with said second apex joining said second angled surfaces to shape and mold the end part into a V shape that matches and is complementary to said convex V shape and said concave V shape when the fitting joint is tightened, said shaped end part of the gas pipe is configured as a folded over, flared end portion, and said folded over, flared end portion of the shaped end part of the gas pipe is in contact with and positioned between both said pair of first angled surfaces and said pair of second angled surfaces, wherein said fitting joint is tightened and said folded over, flared end portion of the shaped end part of the gas pipe forms a plurality of sealing surfaces defined between said shaped end part of said gas pipe and said pairs of said first and second angled surfaces of the convex portion of said clamp ring and the concave portion of said fitting joint, respectively, when the fitting joint is tightened.

2. The clamp ring type metal seal gas pipe joint according to claim 1, wherein the gas pipe comprises a bellow and a cover layer, the cover layer is wrapped outside an outer surface of the bellow, and an end part of the bellow exceeds an end part of the cover layer to form an exposed end.

3. The clamp ring type metal seal gas pipe joint according to claim 2, wherein the clamp ring is sleeved on an outside of the exposed end of the bellow, and an inner surface of the clamp ring is provided with a peak and a valley matched with a ripple on the outer surface of the bellow.

4. The clamp ring type metal seal gas pipe joint according to claim 3, wherein the convex portion is arranged on the peak of the clamp ring.

5. The clamp ring type metal seal gas pipe joint according to claim 4, wherein the convex portion and the concave portion compress the bellow to form said plurality of sealing surfaces, said plurality of sealing surfaces provided with a first sealing surface and a second sealing surface.

6. The clamp ring type metal seal gas pipe joint according to claim 2, wherein a material of the bellow is a stainless steel, and a material of the cover layer is a plastic.

7. The clamp ring type metal seal gas pipe joint according to claim 1, wherein the clamp ring is a half-and-half type clamp ring.

8. The clamp ring type metal seal gas pipe joint according to claim 1, wherein a material of the fitting joint, a material of the nut, and a material of the clamp ring are all a copper.

* * * * *